May 5, 1936.   E. M. BROGDEN   2,039,280
APPARATUS FOR TREATING FRUIT AND THE LIKE
Original Filed Sept. 6, 1923
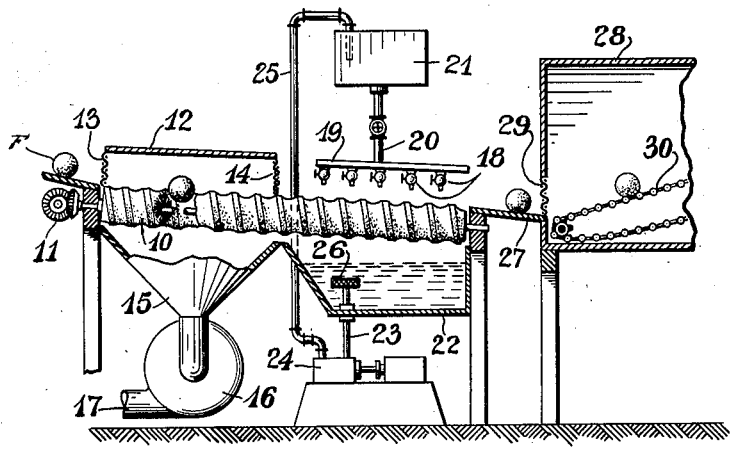
INVENTOR.
ERNEST M. BROGDEN.
BY
his ATTORNEYS.

UNITED STATES PATENT OFFICE 2,039,280

APPARATUS FOR TREATING FRUIT AND THE LIKE

Ernest M. Brogden, Pomona, Calif., assignor to Brogdex Company, Winter Haven, Fla., a corporation of Florida Original application September 6, 1923, Serial No. 661,318. Divided and this application March 4, 1932, Serial No. 596,851

1 Claim. (Cl. 146—202)

This invention relates to apparatus for treating fruit and the like. In one of its aspects, the invention relates more particularly to apparatus wherein fresh fruit, such as oranges or the like, may be subjected to an initial or preliminary rubbing in preparation for the application thereto, by further rubbing, of a treating or protective material. In another of its aspects, the invention relates to apparatus wherein means are provided for directing liquid treating or protective material upon fruit which is being progressively advanced over a predetermined path, together with means for collecting the excess or surplus of said liquid material, separating solid matter therefrom, and returning it for re-use in treating a further quantity of the fruit as aforesaid.

The present application is a division of a copending application Serial No. 661,318, filed September 6, 1923, now Patent 1,848,309, dated March 8, 1932, which in turn is a division of a prior copending application Serial No. 579,052, filed August 1, 1922, now Patent 1,671,923, dated May 29, 1928.

One practical form of apparatus embodying the principles of the invention is shown more or less diagrammatically in the accompanying drawing which is a view in side elevation of an apparatus suitable for the purposes in view, parts being shown broken away and in section.

At 10 are shown the conventional spirally formed rotary brush rolls of a generally well known type of apparatus for rubbing or brushing fresh fruit such as oranges, for example, in preparing the same for market, this apparatus being modified in accordance with the principles of this invention to adapt it for accomplishing the purposes herein set forth. Gearing for driving said brush rolls is indicated at 11. Let it be assumed for purposes of illustration that the treating material to be employed is a liquid by means of which it is desired to cleanse the surface of the fruit from undesirable foreign matter and/or to protect the fruit against decay or withering, or both. Before applying the treating material, whether for cleansing or for protective purposes, or for both, it is usually desirable, although not always essential, to give the fruit a preliminary rubbing treatment which, among other things, serves to remove any loosely adherent foreign matter that may be carried by the fruit. Accordingly, the upper or first half of the inclined rolls 10 is here shown as adapted to give the fruit a preliminary dry rubbing or brushing. This upper portion of said rolls is enclosed by a cover or housing 12 into the upper end of which fruit F can enter as shown through an opening covered by a flexible closure 13 which may consist of a movable flap of canvas or the like, a similar flexible closure 14 being provided to permit the fruit to leave through an opening at the lower end of the housing. Foreign matter dislodged in this preliminary brushing or rubbing operation is received and disposed of by any suitable type of dry dirt collecting means. In the arrangement illustrated, such foreign matter falls into the hopper 15 and may be withdrawn therefrom by exhaust fan 16 and discharged to any convenient place through pipe 17.

Approximately the lower half of the inclined rotary brush rolls 10 is employed in applying the treating or protective material to the fruit and distributing it over the surface thereof. Arranged above this lower portion of the inclined rolls 10 are a plurality of valved pet-cocks or other jet devices 18, connected by suitable pipes 19 and 20 with a gravity supply tank 21 located at a higher level and containing a supply of the treating medium, which is assumed in this instance to be liquid. Fruit leaving housing 12 through the flexible exit 14 and continuing to travel down the runways provided by each pair of said rolls (of which there may be any convenient number) is at once thoroughly rubbed with the liquid material discharged upon the fruit through the jet devices 18, the rotary rolls serving to spin the fruit on varying axes and to thoroughly brush and rub the surfaces thereof. The brushing surfaces of said rolls may advantageously consist of Tampico or other fiber of suitable character such as is commonly employed in machines of this general type. The excess of the liquid treating material over what is required to thoroughly cover the fruit and to saturate the lower half of the rotary brushes 10 is received in a tank 22 from which it may be drawn through pipe 23 by pump 24 and returned through pipe 25 to the supply tank 21 for re-use. Access to the intake end of pipe 23 within the tank may be by way of a suitable strainer or filter device indicated conventionally at 26. Passage of the treating liquid through this device on its way back to tank 21 and jet devices 18 separates from the liquid any undissolved solid matter with which the liquid may have become fouled or contaminated in the operation of rubbing the fruit with said liquid.

The fruit leaves the rubbing or brushing mechanism over inclined chute board 27 for any desired further handling incidental to its preparation and packing for market, but with such further handling the present invention is not concerned. In the present specific example, the fruit is shown entering a drier 28 through a flexible canvas flap doorway 29, the fruit being moved through the drier by a roller belt conveyor indicated at 30.

If the treating material applied to the fruit while it is traveling along the lower or second half of the rotary brush rolls is a liquid, it may be either aqueous or non-aqueous. A suitable non-aqueous liquid for the purpose is a liquid hydrocarbon, such as a refined kerosene or other suitable light oil. Where a protective material is to be applied to the fruit in the second step of the treatment, paraffin wax is satisfactory for the purpose. Proper application of paraffin wax to the surface of the fruit in the form of a very thin film serves to keep the fruit in plump unwithered condition.

What is claimed is:

Apparatus for treating fruit comprising the combination, with fruit rubbing mechanism adapted to provide a predetermined path of fruit travel which includes a preliminary dry rubbing zone followed by a liquid-treatment zone, of a receiving hopper arranged to receive foreign matter brushed off the fruit in said dry rubbing zone, an exhaust fan arranged to withdraw material from said hopper, liquid spray means arranged above said liquid treatment zone, a liquid-collecting receptacle arranged below said liquid-treatment zone, and a system of piping and pump means for withdrawing excess liquid from said receptacle and returning it to said spray means.

ERNEST M. BROGDEN.